(12) United States Patent
Xia et al.

(10) Patent No.: US 9,355,211 B2
(45) Date of Patent: May 31, 2016

(54) UNIFIED TOOL FOR AUTOMATIC DESIGN CONSTRAINTS GENERATION AND VERIFICATION

(71) Applicant: ORACLE INTERNATIONAL CORPORATION, Redwood Shores, CA (US)

(72) Inventors: Yibin Xia, Gilbert, AZ (US); Dinesh Rajasavari Amirtharaj, San Jose, CA (US); Ali Vahidsafa, Palo Alto, CA (US); Alan Smith, Santa Clara, CA (US); Senthilkumar Diraviam, Sunnyvale, CA (US); Mohd Jamil Mohd, Santa Clara, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/511,283

(22) Filed: Oct. 10, 2014

(65) Prior Publication Data

US 2016/0103943 A1   Apr. 14, 2016

(51) Int. Cl.
*G06F 17/50* (2006.01)

(52) U.S. Cl.
CPC .................................. *G06F 17/5081* (2013.01)

(58) Field of Classification Search
CPC .............. G06F 17/505; G06F 17/5031; G06F 17/5045; G06F 2217/86
USPC ........................................... 716/101, 106, 108
See application file for complete search history.

(56) References Cited

U.S. PATENT DOCUMENTS

| | | | | |
|---|---|---|---|---|
| 6,269,467 B1* | 7/2001 | Chang | ................ | G06F 17/5022 716/104 |
| 6,574,778 B2* | 6/2003 | Chang | ................ | G06F 17/5022 716/102 |
| 6,898,770 B2* | 5/2005 | Boluki | ................ | G06F 17/5031 716/112 |
| 6,968,514 B2* | 11/2005 | Cooke | ................ | G06F 17/5045 716/102 |
| 7,039,576 B2* | 5/2006 | Akita | ................ | G06F 17/5022 703/13 |
| 7,231,628 B2* | 6/2007 | Pack | ................ | G03F 1/84 716/52 |
| 7,249,342 B2* | 7/2007 | Pack | ................ | G03F 1/144 430/5 |
| 7,302,672 B2* | 11/2007 | Pack | ................ | G03F 1/144 430/5 |
| 7,603,636 B2* | 10/2009 | Yamada | ................ | G06F 17/5022 716/103 |
| 7,784,016 B2* | 8/2010 | Pack | ................ | G03F 1/144 716/115 |
| 8,407,627 B2* | 3/2013 | Pack | ................ | G03F 1/84 716/50 |
| 8,639,487 B1* | 1/2014 | Ezer | ................ | G06F 17/505 703/13 |

\* cited by examiner

*Primary Examiner* — Sun Lin
(74) *Attorney, Agent, or Firm* — Kraguljac Law Group, LLC (57) ABSTRACT

Systems, methods, and other embodiments associated with providing a unified tool for performing design constraints generation and verification for circuit designs are described. In one embodiment, the unified tool reads design data and design intent information for a circuit design. The unified tool generates physical flow elements and verification flow elements of the circuit design, together and in dependence on each other, based, at least in part, on the design data and the design intent information.

20 Claims, 7 Drawing Sheets

UNIFIED TOOL FOR AUTOMATIC DESIGN CONSTRAINTS GENERATION AND VERIFICATION

BACKGROUND

With the increasing complexity of microprocessor and system-on-chip (SOC) design, more and more attention is being paid to improving the processes of generating and verifying circuit design constraints. Manual processes for creating design constraints for physical composition and verification of the constraints are becoming infeasible on designs with extensive clock gating and multiple clock and power domains. Tools have attempted to automate the process of constraints generation and other tools have attempted to automate the process of constraints verification. However, these attempts have had limited success.

One challenge facing these tools is that of understanding all the different design varieties. Previous tools generated a small subset of design constraints from typical pre-existing designs that were known, and yet still required heavy manual involvement by circuit designers to determine the rest of the constraints. Verification of design constraints is handled separately and independently by other different tools and is performed subsequently at the later stages of the design process. Inconsistency between constraints applied to the physical implementation and constraints verified in the verification flow is a significant issue. For example, constraints such as multi-cycle paths applied to the timing analysis in the physical flow may not be verified in the verification flow due to the usage of different tools that operate independently. The independent tools also caused certain components to not be checked during verification such as missing level-shifters between different power domains.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Systems and methods are described herein that provide automatic design constraints generation and verification for circuit designs. In one embodiment, a new design intent language is disclosed that allows designers to capture the design complexity of a circuit design. In another embodiment, a unified tool is disclosed that reads in data structures comprising design data and design intent, analyzes and cross-checks the functionality of the design, and generates the design constraints, test benches, and assertions dependently together. The design constraints may then be fed into a physical flow of the circuit design.

The physical flow of the circuit design is used to translate the circuit design into, for example, a physical layout of an integrated circuit (IC) chip based on the constraints (i.e., making sure that the constraints are not violated). Similarly, the test benches and assertions may then be fed into a verification flow of the circuit design. The verification flow of the circuit design is used to verify that the circuit design, in the physical layout form defined by the physical flow, functions correctly (e.g., the circuit generates expected outputs for a set of inputs). Thus in one embodiment, the disclosed unified tool provides consistency of constraints between the physical flow and the verification flow by generating the components for both flows together rather than separately, allowing constraint verification to occur at an early stage in the design process.

Figure 1:
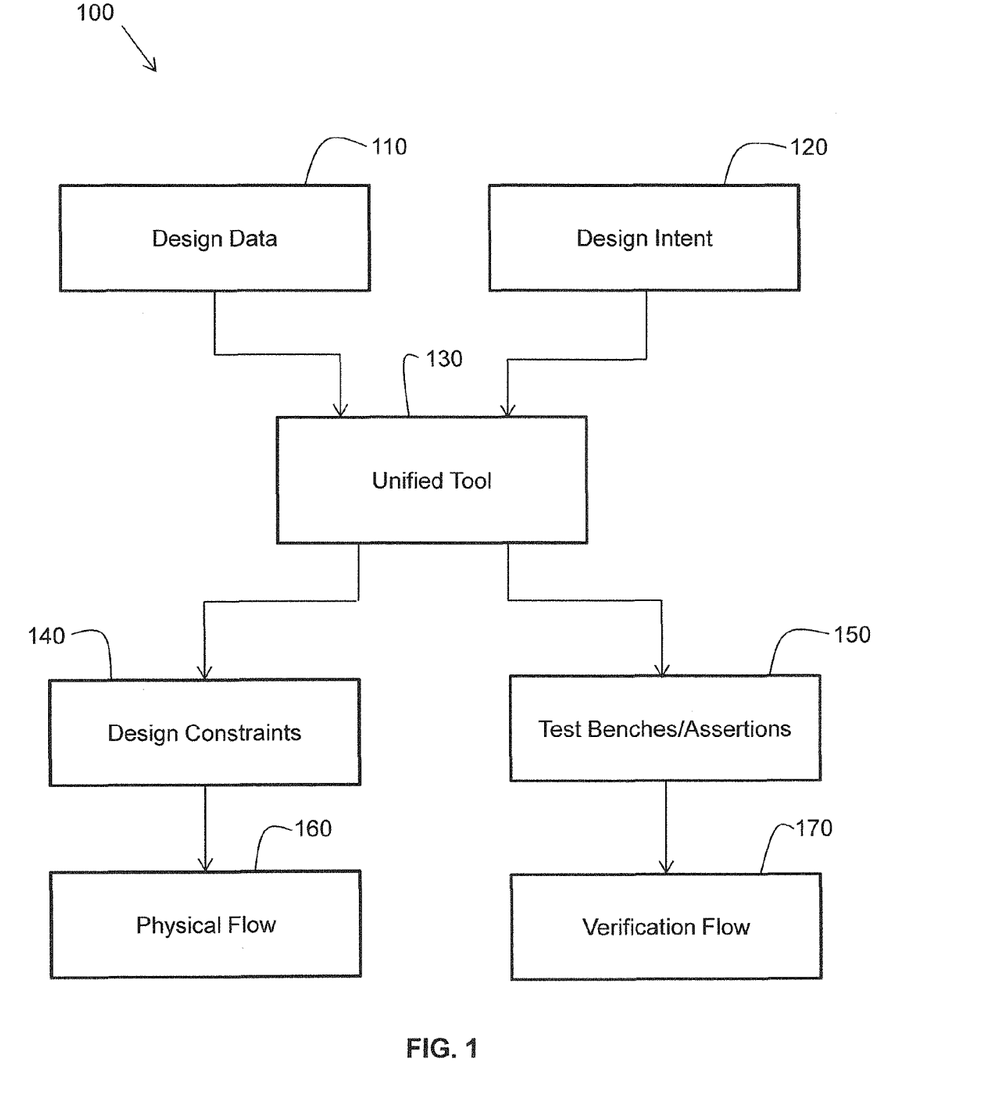
FIG. 1 illustrates one embodiment of a unified tool and a solution flow for generating constraints for a physical flow of a circuit design and corresponding test benches and assertions for a verification flow of the circuit design.

FIG. 1 illustrates one embodiment of a solution flow 100 showing how design data 110 and a design intent specification 120 for a circuit design are input to a unified tool 130. The unified tool 130 is configured to generate both design constraints 140 and test benches and assertions 150, respectively, for a physical flow 160 and a verification flow 170 of the circuit design. In accordance with an embodiment, both design data 110 and a design intent specification 120 of a circuit design created by designers are used as inputs to the unified tool 130. This provides a more consistent technique for processing, generating, and verifying circuit designs rather than using different tools for different parts of the design process.

In one embodiment, the design data 110 may be expressed in hardware descriptive language (HDL) and/or register transfer language (RTL), for example, and defines the connectivity and behavioral characteristics of the circuit design. The design intent specification (DIS) 120 may be expressed using a design intent language (DIL), for example, that contains various types of commands and associated syntax, and which defines various relationships of the circuit design. For example, the DIL may include basic intent commands, specific intent commands, and commands for special signals. The basic intent commands may define, for example, modes, clocks, groups for paths, voltages, power nets, and units for the circuit design. The specific intent commands may define, for example, clock domain crossings (CDCs) and power gating of the circuit design. A command for a special signal may define, for example, a constant signal of the circuit design.

The unified tool 130 is configured to read the design data 110 and the DIS 120 and generates the constraints 140 for the physical flow 160 and the test benches and assertions 150 for the verification flow 170. In one embodiment, (i) the constraints 140 and (ii) the test benches and assertions 150 are generated together and in dependence on each other by the unified tool 130. Since both types of data are processed together by the unified tool 130, the unified tool 130 has access to both data for comparison and generating values in accordance with each other. Thus the unified tool 130 is configured to make sure that the constraints 140 and the test benches and assertions 150 are consistent with each other (i.e., do not contradict each other, no conflicts) and that no informational gaps exist.

In accordance with an embodiment, the constraints 140 define the various physical and performance constraints of the circuit design. The physical flow 160 of the circuit design is used to translate the circuit design into, for example, a physical layout of an integrated circuit (IC) chip based on the constraints (i.e., making sure that the constraints are not violated).

In accordance with an embodiment, a test bench is a simulator that applies stimuli (e.g., assertions in the form of test vectors) to the inputs of the circuit design and captures responses from the outputs of the circuit design during simulation in the verification flow 170. The verification flow 170 of the circuit design is used to verify that the circuit design, in the physical layout form defined by the physical flow, functions correctly (e.g., the circuit generates expected outputs for a set of inputs). Verification with assertions refers to the use of an assertion language/code to specify expected behavior in a design and to evaluate the assertions relative to the design under verification. An assertion specifies an expected behavior of the design.

Figure 2:
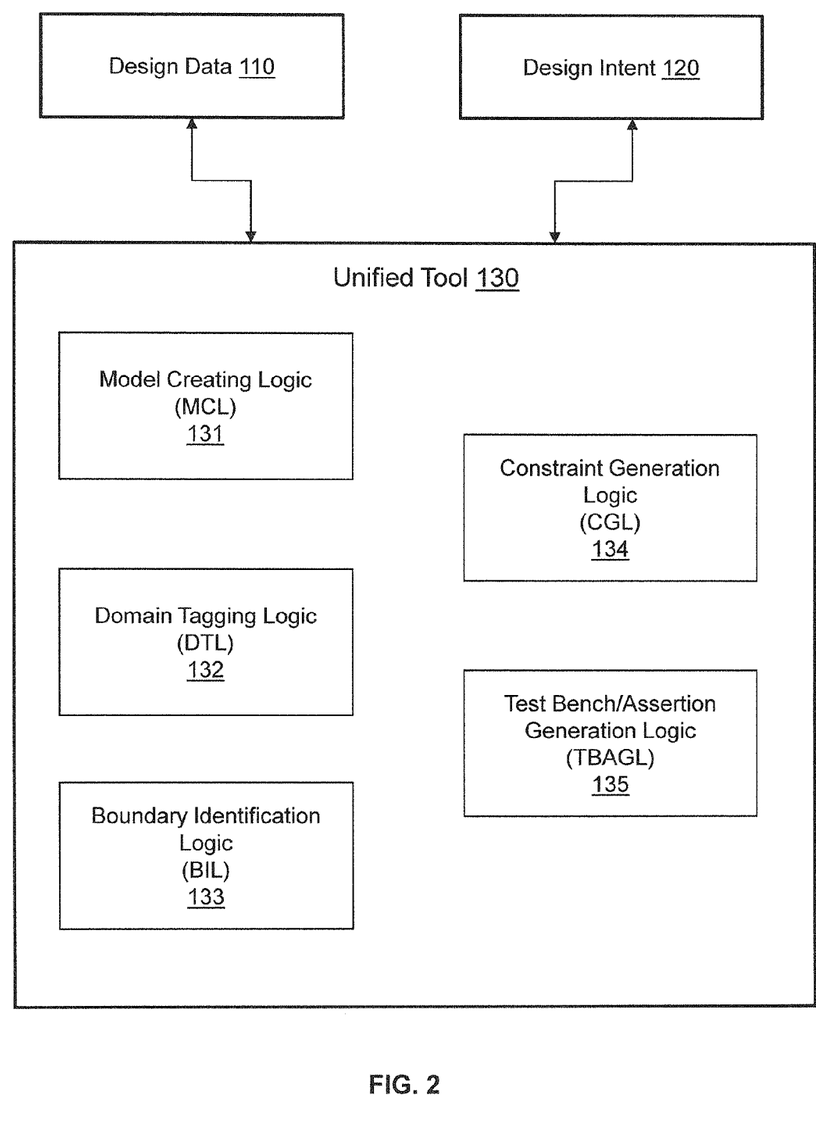
FIG. 2 illustrates one embodiment of the unified tool of FIG. 1.

Again, the unified tool 130 generates the constraints 140 for the physical flow 160 and generates the test benches and assertions 150 for the verification flow 170 of the circuit design to ensure that the constraints 140 and the test benches and assertions 150 are consistent with each other. FIG. 2 illustrates one embodiment of the unified tool 130 of FIG. 1.

With reference to FIG. 2, in one embodiment, the unified tool 130 is implemented on a computing device and includes a plurality of logics for implementing various functional aspects of the unified tool 130. The plurality of logics include a model creating logic (MCL) 131, a domain tagging logic (DTL) 132, a boundary identification logic (BIL) 133, a constraint generation logic (CGL) 134, and a test bench/assertion generation logic (TBAGL) 135. In one embodiment, the unified tool 130 is an executable algorithm (as part of an executable application) configured to perform the functions of the logics and is stored in a non-transitory medium in the computing device.

In one embodiment, the components of the unified tool 130 may be configured to function as follows. The MCL 131 is configured to read the design data 110 of a circuit design (e.g., from a data structure such as, for example, a data file). Using the design data, the MCL 131 is configured to bind instances to their corresponding modules in the circuit design, and create internal computerized design models of the circuit design.

The DTL 132 is configured to read data structures having the design intent specification 120 of the circuit design, analyze the design models with clock and power information from the design intent specification 120 by traversing forwards and backwards through the design models, and tagging associated design models with the proper clock and power domains. The BIL 133 is configured to perform clock domain crossing identification and power domain boundary identification such that the design models that cross the clock domains or the power domains may be identified.

The CGL 134 is configured to analyze and cross-check the design intent of the design intent specification 120 with the design models, perform calculations based on clock frequencies and power voltages, manipulate or expand signal names, and generate all of the proper design constraints 140 for the physical flow 160 of the circuit design. The TBAGL 135 is similar to the CGL 134 in that the TBAGL 135 is configured to analyze and cross-check the design intent of the design intent specification with the computerized design models, and generate the test benches and assertions 150 for the verification flow 170 of the circuit design. The CGL 134 and TBAGL 135 are configured to operatively cooperate/communicate with each other to ensure that the design constraints, test benches, and assertions are consistent with each other (i.e., do not contradict each other, no conflicts). In this manner, a single unified tool can generate elements, for both the physical flow and the verification flow, that are consistent with each other.

Figure 3:
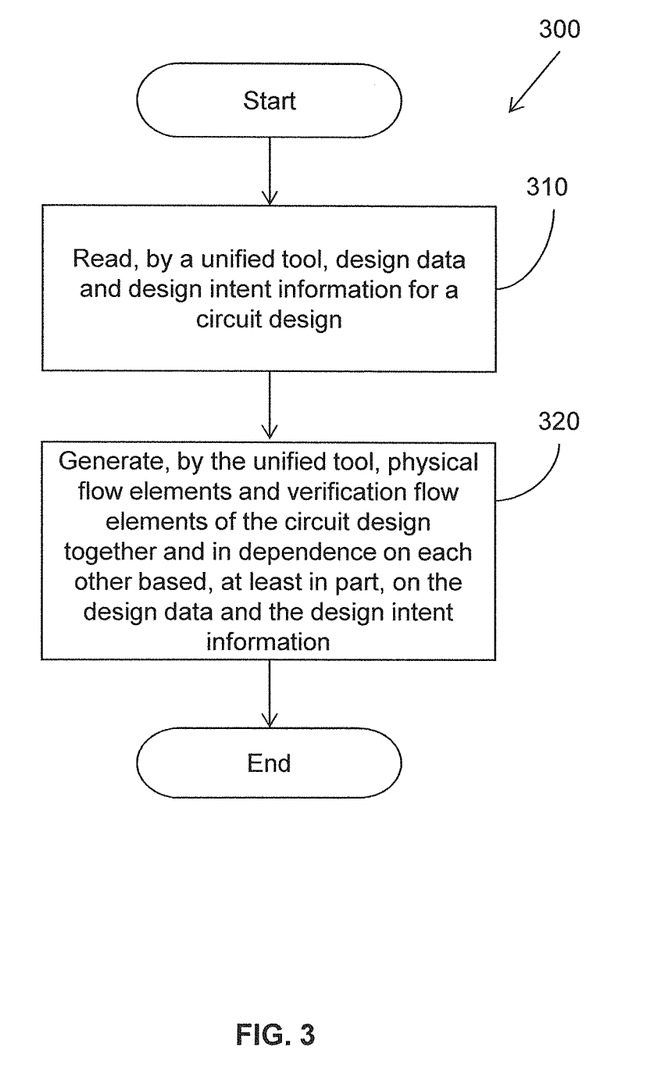
FIG. 3 illustrates one embodiment of a method performed by the unified tool of FIG. 2, for generating elements for a physical flow of a circuit design and corresponding elements for a verification flow of the circuit design.

FIG. 3 illustrates one embodiment of a method 300 for generating elements (e.g., design constraints 140) for a physical flow 160 of a circuit design and corresponding elements (e.g., test benches and assertions 150) for a verification flow 170 of the circuit design. In one embodiment, method 300 is implemented to be performed by the unified tool 130 of FIG. 1 or 2, or by a computing device configured with an algorithm of method 300. Method 300 will be described from the perspective that inputs to the unified tool 300 (e.g., design data and a design intent specification for a circuit design) have already been created.

At block 310 of the method 300, a first input of data structures, comprising design data 110 for the circuit design, and a second input of data structures, comprising design intent information 120 for the circuit design, are read by the unified tool 130 using at least hardware of a computer. At block 320, a first output of data structures from the unified tool 130, comprising physical flow elements (e.g., design constraints 140), and a second output of data structures from the unified tool 130, comprising verification flow elements (e.g., test benches and assertions), are generated by the unified tool 130. The generation of the physical flow elements and the verification flow elements is based, at least in part, on the design data and the design intent information.

In accordance with one embodiment, the physical flow elements and the verification flow elements are generated by the same application or tool (e.g., the unified tool 130) together and in dependence on each other. The dependency is obtained by processing both inputs (the design data and the design intent information) together by the same tool. Using the same tool allows the tool to ensure that the physical flow elements and the verification flow elements are consistent with each other (i.e., do not contradict each other, no conflicts). In this manner, the design process is more reliable and efficient as compared to using two or more separate tools to generate the flow elements, which may result in the flow elements being inconsistent with each other and requiring many iterations to resolve the inconsistencies.

Figure 4:
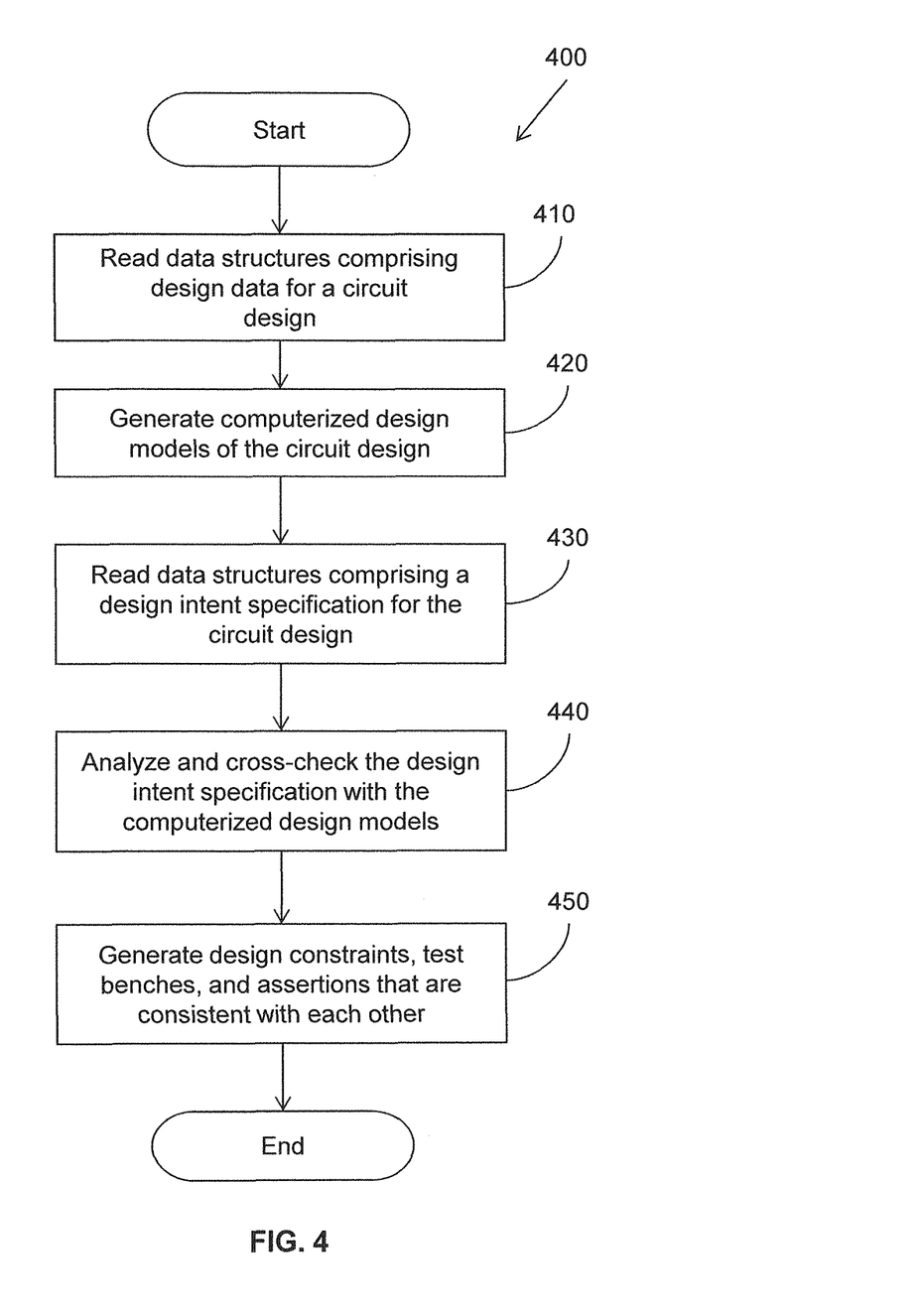
FIG. 4 illustrates another embodiment of a method, performed by the unified tool of FIG. 2, for generating constraints for a physical flow of a circuit design and corresponding test benches and assertions for a verification flow of the circuit design.

FIG. 4 illustrates another embodiment of a method 400 for generating constraints 140 for a physical flow 160 of a circuit design and corresponding test benches and assertions 150 for a verification flow 170 of the circuit design. Method 400 is implemented to be performed by the unified tool 130 of FIG. 1 or 2, or by a computing device configured with an algorithm of method 400. Method 400 will be described from the perspective that design data and a design intent specification for a circuit design have already been created.

At block 410 of the method 400, data structures comprising design data 110 for the circuit design are read, using at least hardware of a computer. At block 420, computerized design models of the circuit design are built (generated) based on the design data 110. At block 430, data structures comprising a design intent specification 120 for the circuit design are read, using at least hardware of the computer. At block 440, the design intent specification 120 is analyzed and cross-checked with the computerized design models. At block 450, (i) design constraints 140 (for a physical flow 160 of the circuit design), and (ii) test benches and assertions 150 (for a verification flow 170 of the circuit design) are generated together and in dependence on each other. Generating both of the data components is based on the analyzing and cross-checking, while ensuring that the design constraints 140 and test benches and assertions 150 are consistent with each other. In this manner, the physical flow elements and the verification flow elements are generated by the same tool, instead of using two or more separate tools to generate the flow elements, which may result in the flow elements being inconsistent with each other and requiring many iterations to resolve the inconsistencies.

Figure 5:
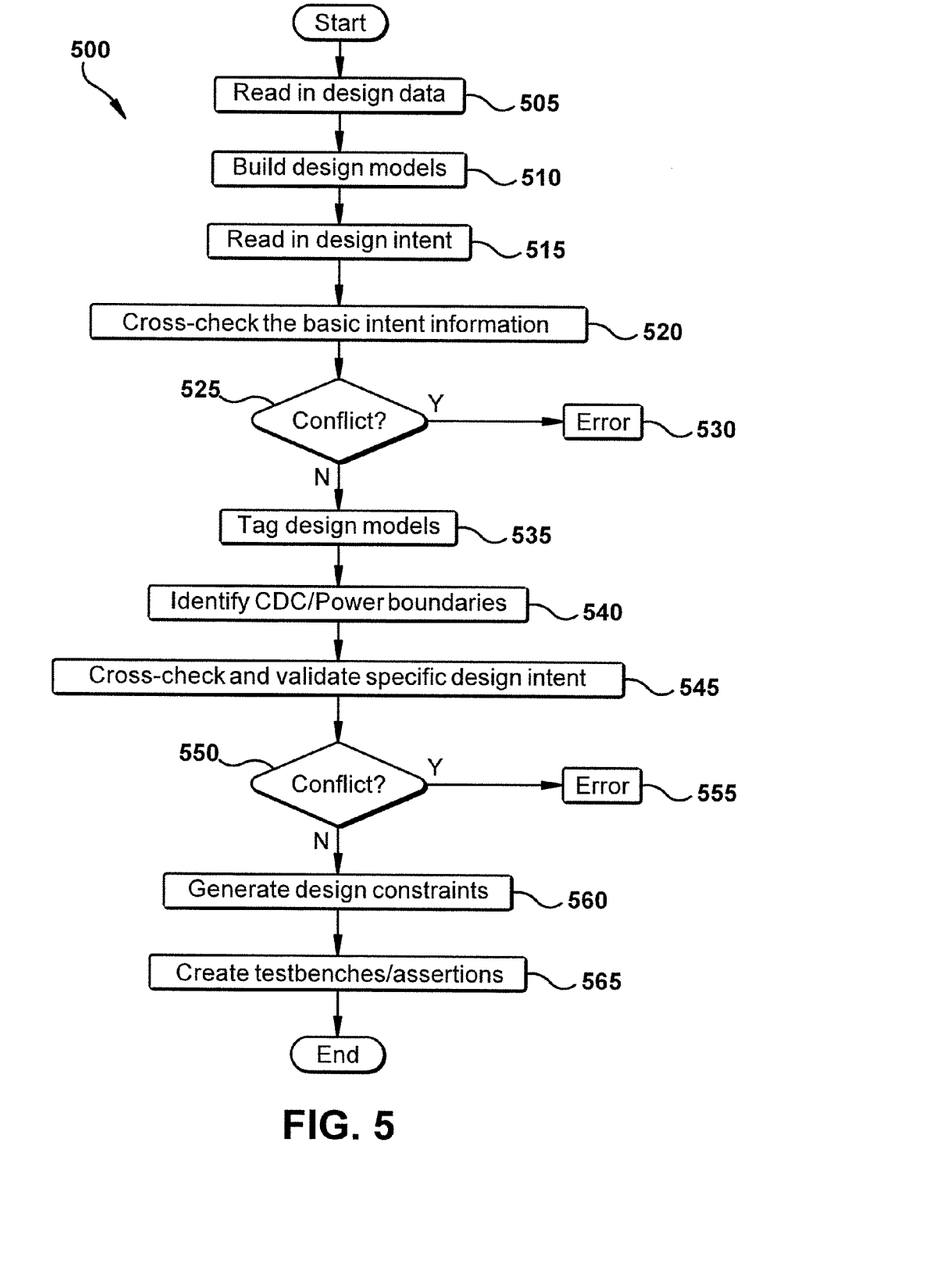
FIG. 5 illustrates another embodiment of a method, performed by the unified tool of FIG. 2, for generating constraints for a physical flow of a circuit design and corresponding test benches and assertions for a verification flow of the circuit design.

FIG. 5 illustrates another embodiment of a computer-implemented method 500 for generating components for both a physical flow and a verification flow of a circuit design is disclosed. As previously stated, the components include constraints 140 for the physical flow 160 of a circuit design and corresponding test benches and assertions 150 for the verification flow 170 of the circuit design. In one embodiment, both of these components are generated by the same design software tool (e.g., the unified tool 130 of FIGS. 1 and/or 2). Thus, consistency between the design constraints and the test benches/assertions may be improved. Method 500 may be implemented to be performed by the unified tool 130 of FIG. 1 or 2, or by a computing device configured with an algorithm of method 500. Method 500 will be described from the perspective that design data and a design intent specification for a circuit design have already been created.

Upon initiating method 500, at block 505, design data 110 (e.g., in the form of one or more data structures) for a circuit design is read, using at least hardware of a computer. At block 510, computerized design models of the circuit design are built (i.e., generated) based on the design data 110. At block 515, a design intent specification 120 (e.g., in the form of one or more data structures) for the circuit design is read, using at least hardware of the computer.

In accordance with an embodiment, the design intent specification (DIS) 120 may include basic design intent information and specific design intent information expressed in a design intent language (DIL). For example, the DIL may include basic intent commands, specific intent commands, and commands for special signals. The basic intent commands may define, for example, modes, clocks, groups for paths, voltages, power nets, and units for the circuit design. The specific intent commands may define, for example, clock domain crossings (CDCs) and power gating of the circuit design. Commands for special signals may define one or more special signals of the circuit design such as, for example, a constant signal of the circuit design. Other types of basic intent commands, specific intent commands, and specific signal commands are possible as well, in accordance with other embodiments.

An example of a basic command for mode definition is as follows:
    define_mode
        -name mode_name
        -condition expression
        [-comment comment_string]

An example of a specific intent command to capture a clock domain crossing (CDC) path using a synchronizer is as follows:
    define_flop_async_path
        -clock clock_name
        -cycles value
        [-from from_list]
        [-to to_list]
        [-through through_list]
        [-group path_group]
        [-mode mode]
        [-module module]
        [-comment comment_string]

An example of a command for a special signal such as, for example, a constant signal is as follows:
    define_constant_signal
        -name signal_name
        -value value
        [-mode mode]
        [-module module]
        [-comment comment_string]

Continuing with method 500, at block 520, basic design intent information from the design intent specification 120 is analyzed and cross-checked with the computerized design models. At block 525, if a conflict is identified between the basic design intent information and the computerized design models, then an error is generated at block 530. The error may indicate to the user (designer) to go back and modify one or more elements of the design data 110 and/or of the design intent specification 120 to overcome (eliminate) the conflict. In accordance with an embodiment, the unified tool 130 is configured to provide a suggestion to the user as to how to overcome the conflict. In accordance with another embodiment, the unified tool 130 may be configured to automatically modify the design data 110 and/or the design intent specification 120 to overcome the conflict. In one embodiment, the suggestions or modifications are generated based on matching predefined conflicts and corresponding known solutions.

If no conflict is identified at block 525, then the method 500 moves on to block 535 where the computerized design models are tagged with the proper clock and/or power domains. At block 540, clock domain crossings and power domain crossings are identified in the computerized design models.

At block 545, specific design intent information from the design intent specification 120 is analyzed, cross-checked, and validated with the computerized design models. At block 550, if a conflict is identified between the specific design intent information and the computerized design models, then an error is generated at block 555. Similar to the actions performed at block 530, the error may indicate to the user (designer) to go back and modify one or more elements of the design data 110 and/or of the design intent specification 120 to overcome the conflict. In accordance with an embodiment, the unified tool 130 may provide a suggestion to the user as to how to overcome the conflict. In accordance with another embodiment, the unified tool 130 may automatically modify the design data 110 and/or the design intent specification 120 to overcome the conflict.

If no conflict is identified at block 550, then the method 500 moves on to block 560 and block 565 where the design constraints 140 for the physical flow 160 and the test benches and assertions 150 for the verification flow 170 are generated. In one embodiment, the design constraints 140 and the test benches and assertions 150 are generated together and in dependence on each other based on analyzing and cross-checking the data together. In this manner, the method ensures that the design constraints 140 and test benches and assertions 150 are consistent with each other (i.e., do not contradict each other, no conflicts). The design constraints 140 may be output to one or more physical flow data structures (e.g., an electronic file) and the test benches and assertions may be output to one or more verification flow data structures (e.g., an electronic file) by the unified tool 130. In this manner, both the design constraints and the test benches and assertions may be generated by a single unified tool, instead of using two or more separate tools which may result in the elements of the physical flow and the verification flow being inconsistent with each other and requiring many iterations to resolve the inconsistencies.

Figure 6:
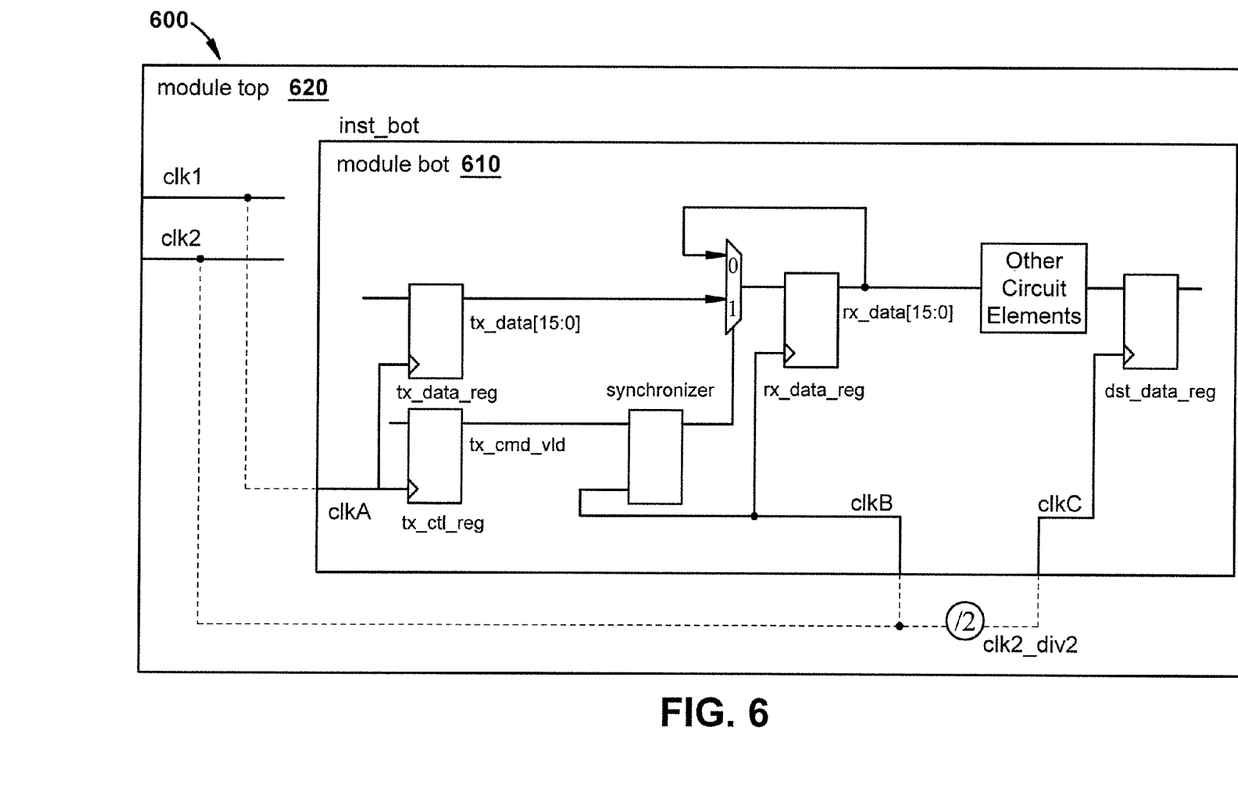
FIG. 6 illustrates one embodiment of a partial circuit design that uses clock domain crossing techniques.

FIG. 6 illustrates one example embodiment of a partial circuit design 600 that uses clock domain crossing (CDC) techniques, and is used herein to illustrate an example of the method 500 of FIG. 5 performed by the unified tool 130. The design 600 is a partial circuit design in that the design 600 is just a part of a larger circuit design, and in that certain circuit elements that occur between other circuit elements may not be shown.

In accordance with an embodiment, the design constraints 140 generated by the unified tool 130 are in Synopsys Design Constraints (SDC) format, and the assertions 150 for verification generated by the unified tool 130 are in System Verilog Assertion (SVA) syntax. In one embodiment, SDC is a format used to specify the design intent including timing, power and area constraints for the circuit design. SVA provides features to specify assertions of a design. As stated previously, an assertion specifies an expected behavior of the design. Of course, other types of languages or syntax may be used to specify assertions for verifying a design.

FIG. 6 shows the partial circuit design 600 using some clock domain crossing techniques in the module "bot" 610 which is instantiated as "inst_bot" at one level of hierarchy in the design of the module "top" 620. In accordance with an embodiment, the design intent specification 120 uses a newly defined language, examples of which are used below herein. The design intent specification file 120 for the module top 620 contains the following related basic design intent commands to define clock and timing characteristics of the partial circuit design 600:

define_unit—time ns
define_clock—name clk1—period 0.2—module top
define_clock—name clk2—period 0.5—module top
define_generated_clock—name clk2_div2—master_clock clk2—divide_by 2—module top The design intent specification file 120 for the module top 620 further contains the following related specific design intent commands to define clocked circuit paths of the partial circuit design 600:

define_dmux_async_path—from bc.data_reg\
  -to rx.data_reg\
  -clock clkB\
  -cycles 2\
  module bot
define_flop_async_path—from tx.ctl_reg\
  -to synchronizer\
  -clock clkB\
  -cycles 2\
  module bot
define_mc_sync_path—from rx_data_reg\
  -to dst_data_reg\
  -clock clkB\
  -cycles 2\
  -module bot With respect to the partial circuit design 600, the unified tool 130 first reads in the design data 110 and creates the design models for all of the hierarchies in the design of module top 620. Then the unified tool 130 parses the design intent specification file 120 and validates clock information including clk1, clk2, and clk2_div2 with the design models. By tracing the clock signals, the unified tool 130 tags the design models with clock domains and identifies clock domain crossing boundaries. For example, clkA of the circuit elements tx_data_reg and tx_ctl_reg of the circuit design 600 is associated with clk1, and the circuit elements belong to the clk1 clock domain. Furthermore, clkB of the circuit element rx_data_reg of the circuit design 600 is associated with clk2, and the circuit element belongs to the clk2 clock domain.

Taking a closer look at the partial circuit design 600, the clk1 and clk2 domains are not synchronized with each other. Clk2_div2 is synchronized to clk2 but is at a different frequency (half frequency). The unified tool 130 traces clkA back to clk1 (there may be other circuitry in between) and traces clkB back to clk2 (there may be other circuitry in between), and tags the clock domains accordingly. In the partial circuit design 600, some data is being clocked at one clock rate (e.g., clkA) and other data is being clocked at another clock rate (e.g., clkB, where clkA is unsynchronized with clkB). Two data paths may be synchronized with each other by introducing a delay (e.g., through a demultiplexer circuit element). In general, delays may be calculated for clock domain crossings identified in the computerized design models.

Therefore, after validating the specific clock domain crossing (CDC) design intents with the clock boundary information, the unified tool 130 may then calculate one or more delays based on the clock and cycle information. For example, in the design intent "define_dmux_async_path", since clkB has the same period of clk2 which is 0.5 ns, the maximum delay for the path (i.e., the delay from circuit element tx_data_reg to circuit element rx_data_reg) may be calculated by multiplying the number of cycles defined in "define_demux_async_path" with the period, resulting in 1.0 ns (i.e., 2 cycles*0.5 ns).

In one embodiment, the unified tool 130 then creates the following SDC commands 140 (design constraints) for the physical flow 160 and the corresponding SVA assertions 150 for the verification flow 170:

SDC Commands:
set_max_delay 1\
  -from top . . . inst_bot.tx_data_reg/clk\
  -to top . . . inst_bot.rx_data_reg/d
set_max_delay 1\
  -from top . . . inst_bot.tx_ctl_reg/clk\
  -to top . . . inst_bot.synchronizer/d
set_multicycle_path 2\
  -from top . . . inst_bot.rx_data_reg/clk\
  -to top . . . inst_bot.dst_data_reg/d\
  -start SVA Assertions:
module top_mcp_1 (input src_clk, input src_d, input src_q,
  input dst_clk, input dst_d, input dst_q,
  input monitor_clk, input en, input [7:0] cycle;
property p_mcp_1;
@posedge src_clk)
if(src_q!=$past(src_q)|->
  . . .
end property
mcp_1: assert property(p_mcp_1);
endmodule
bind top top_mcp_1 u_mcp1_bind ( . . . );

The SDC commands and the SVA assertions listed above may represent only a small subset of the total design constraints, test benches, and assertions that are provided to a physical flow and a verification flow. Of course, other types of commands and assertions may be created based on the design.

In accordance with one embodiment, the unified tool 130 may also analyze the circuit design 600 based on power. For example, the unified tool 130 may perform analyzing and cross-checking by parsing the design intent specification 120 and validating power information with the computerized design models. In one embodiment, voltage level shifts are validated for power domain crossings identified in the computerized design models.

As a result, by using the method 500 of FIG. 5 on the partial circuit design 600 of FIG. 6, the resulting design constraints (SDC commands) and assertions (SVA assertions) generated by the unified tool 130 are ensured to be consistent with each other. The method 500 provides for a way to automate the generation of both the design constraints and the corresponding verification consistently and systematically. The method 500 may be used on any design constraints including timing and power and may work on any levels of the design including RTL Verilog/VHDL and ESL SystemC, and any models including behavioral, structural, and hybrid models.

Figure 7:
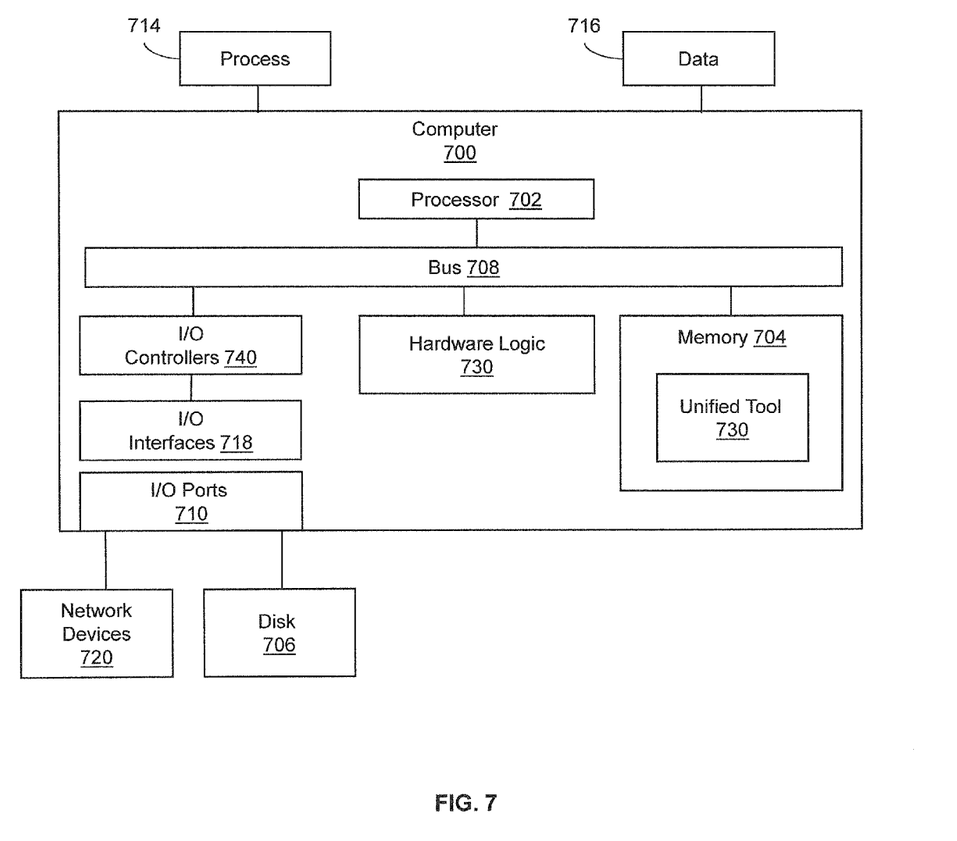
FIG. 7 illustrates one embodiment of a computing device configured with the unified tool of FIG. 2.

FIG. 7 illustrates one example embodiment of a computing device configured with the unified tool 130 of FIG. 1 or 2. The example computing device may be a computer 700 that includes at least a processor 702, a memory 704, and input/output ports 710 operably connected by a bus 708. In one example, the computer 700 may include the unified tool 130 configured to facilitate the generation of the design constraints and the test benches and assertions together and in dependence on each other, in accordance with the solution flow of FIG. 1 and the logics of FIG. 2. This may ensure that the constraints and the test benches and assertions are consistent with each other.

In accordance with one embodiment, the unified tool 130 is implemented computer-executable instructions (as an algorithm) stored in the memory 704. The processor 702 may read in and execute the instructions via the bus 708. However, it is to be understood that, in different embodiments, the unified tool 130 may be implemented in hardware (e.g., as hardware logic 730 connected to the bus 708), a non-transitory computer-readable medium with stored instructions, firmware, and/or combinations thereof.

In one embodiment, the unified tool 130 or the computer 700 may be a structure (e.g., hardware, non-transitory computer-readable medium, firmware). The structure may be for facilitating the generation of the constraints 140 and the test benches and assertions 150 together and in dependence on each other, to ensure that the constraints 140 and the test benches and assertions 150 are consistent with each other. The generation of the constraints 140 and the test benches and assertions 150 may be performed in accordance with the solution flow of FIG. 1 and the logics of FIG. 2.

The structure may be implemented, for example, as an ASIC or microprocessor programmed to facilitate the generation of the constraints 140 for a physical flow 160 of a circuit design and the corresponding test benches and assertions 150 for a verification flow 170 of the circuit design. The structure may also be implemented as stored computer executable instructions that are presented to computer 700 as data 716 in the form of data structures that are temporarily stored in memory 704 and then executed by processor 702. Accordingly, such structured implementations of the methods of FIGS. 3, 4, and/or 5 may ensure that that the design constraints 140 and the test benches and assertions 150 are consistent with each other.

Generally describing an example configuration of the computer 700, the processor 702 may be a variety of various processors including dual microprocessor and other multiprocessor architectures. A memory 704 may include volatile memory and/or non-volatile memory. Non-volatile memory may include, for example, ROM, PROM, and so on. Volatile memory may include, for example, RAM, SRAM, DRAM, and so on.

A storage disk 706 may be operably connected to the computer 700 via, for example, an input/output interface (e.g., card, device) 718 and an input/output port 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with input/output devices via the I/O interfaces 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the I/O interfaces 718, and/or the I/O ports 710. Through the network devices 720, the computer 700 may interact with a network. Through the network, the computer 700 may be logically connected to remote computers. Networks with which the computer 700 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions configured as an algorithm that when executed by a machine (e.g., processor, computer, and so on) cause the machine (and/or associated components) to perform the disclosed methods.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C §101.

DEFINITIONS

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
LAN: local area network.
RAM: random access memory.
DRAM: dynamic RAM.
SRAM: synchronous RAM.
ROM: read only memory.
PROM: programmable ROM.
USB: universal serial bus.
WAN: wide area network.

"Computer-readable medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can function with. Each type of media, if selected for implementation in one embodiment, includes stored instructions of an algorithm configured to perform one or more of the disclosed and/or claimed functions. For example, a non-transitory computer-readable medium may store computer-executable instructions that are part of an algorithm that, when executed by a computer, cause the computer to perform one of the disclosed methods, the instructions comprising instructions configured for performing one or more disclosed and/or claimed functions.

"Logic", as used herein, includes computer or electrical hardware, firmware, a non-transitory medium with stored instructions, and/or combinations of these to perform any of the functions or actions as disclosed herein, and/or to cause a function or action from another logic, method, and/or system to be performed as disclosed herein. Logic may include a microprocessor programmed with an algorithm, a discrete logic (e.g., ASIC), at least one circuit, an analog circuit, a digital circuit, a programmed logic device, a memory device containing instructions of an algorithm, and so on, all of which are configured to perform one or more of the disclosed functions. Logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. Logic is limited to statutory subject matter under 35 U.S.C. §101.

A "data structure", as used herein, is an organization of data that is stored electronically in a computing device, storage device, and/or memory. A data structure may be any one of, for example, a data file, a data array, a data record, a data table, a graph, a tree, etc. Other examples of data structures are possible as well, in accordance with other embodiments.

"User", as used herein, includes but is not limited to one or more persons, computers or other devices, or combinations of these.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A computer-implemented method comprising:
   reading, by a unified tool,
      (i) design data for a circuit design, and
      (ii) design intent information for the circuit design; and
   generating, by the unified tool,
      (i) physical flow elements of the circuit design, and
      (ii) verification flow elements of the circuit design,
      wherein the generating physical flow elements and the generating verification flow elements are performed together and in dependence on each other by the unified tool based, at least in part, on the design data and the design intent information.

2. The computer-implemented method of claim 1, further comprising:
   building, by the unified tool, computerized design models of the circuit design based on the design data; and analyzing and cross-checking, by the unified tool, the design intent information with the computerized design models,
wherein the generating is performed based, at least in part, on the analyzing and cross-checking, and
wherein the generating including comparing and ensuring that the physical flow elements and the verification flow elements are consistent with each other.

3. The computer-implemented method of claim 1,
wherein the generating physical flow elements comprises generating design constraints of the circuit design; and
wherein the generating verification flow elements comprises generating test benches and assertions of the circuit design.

4. The computer-implemented method of claim 2, wherein the analyzing and cross-checking comprises performing calculations based on clock frequencies of the circuit design.

5. The computer-implemented method of claim 2, wherein the analyzing and cross-checking comprises performing calculations based on power voltages of the circuit design.

6. The computer-implemented method of claim 2, wherein the analyzing and cross-checking comprises tagging the computerized design models with clock domains and performing clock domain crossing identification of the circuit design.

7. The computer-implemented method of claim 2, wherein the analyzing and cross-checking comprises tagging the computerized design models with power domains and performing power domain boundary identification of the circuit design.

8. The computer-implemented method of claim 2, further comprising generating an error based, at least in part, on the analyzing and cross-checking when a conflict occurs between the design intent information and the computerized design models.

9. The computer-implemented method of claim 2, further comprising modifying one or more of the design data or the design intent information to eliminate a conflict occurring between the design intent specification and the computerized design models as identified by an error generated based, at least in part, on the analyzing and cross-checking.

10. A computing system, comprising:
model creating logic configured to read data structures comprising design data of a circuit design and generate computerized design models based on the design data;
domain tagging logic configured to:
read data structures comprising a design intent specification of the circuit design,
perform an analysis of the computerized design models using at least clock and power information from the design intent specification, and
tag the computerized design models with clock domains and power domains identified by the analysis;
boundary identification logic configured to identify, from the computerized design models, crossings of the clock domains and crossings of the power domains;
constraint generation logic configured to analyze and cross-check a design intent of the design intent specification with the computerized design models and generate design constraints for a physical flow of the circuit design; and
test bench and assertion generation logic configured to analyze and cross-check the design intent of the design intent specification with the computerized design models and generate test benches and assertions for a verification flow of the circuit design.

11. The computing system of claim 10, wherein the constraint generation logic and the test bench and assertion generation logic are configured to operatively cooperate with each other to ensure that the design constraints, test benches, and assertions are consistent with each other.

12. The computing system of claim 10, wherein the design intent specification comprises basic intent commands expressed in a design intent language that define one or more of modes, clocks, groups for paths, voltages, power nets, and units for the circuit design.

13. The computing system of claim 10, wherein the design intent specification comprises specific intent commands expressed in a design intent language that define one or more of clock domain crossings and power gating of the circuit design.

14. The computing system of claim 10, wherein the design intent specification comprises signal commands expressed in a design intent language that define one or more signals of the circuit design.

15. A non-transitory computer-readable medium storing computer-executable instructions that, when executed by a processor of a computer, cause the computer to perform a method, wherein the instructions comprise:
instructions for reading data structures comprising design data for a circuit design, using at least hardware of the computer;
instructions for building computerized design models of the circuit design based on the design data;
instructions for reading data structures comprising a design intent specification for the circuit design;
instructions for analyzing and cross-checking the design intent specification with the computerized design models; and
instructions for generating based, at least in part, on the analyzing and cross-checking:
(i) design constraints for a physical flow of the circuit design, and
(ii) test benches and assertions for a verification flow of the circuit design,
wherein the generating is configured to ensure that the design constraints, the test benches, and the assertions are consistent with each other.

16. The non-transitory computer-readable medium of claim 15, wherein the instructions for generating the design constraints, test benches, and assertions are configured to generate the design constraints, test benches, and assertions together and in dependence on each other.

17. The non-transitory computer-readable medium of claim 15, wherein the instructions for analyzing and cross-checking are configured to parse the design intent specification and validate clock information with the computerized design models.

18. The non-transitory computer-readable medium of claim 15, wherein the instructions for analyzing and cross-checking are configured to parse the design intent specification and validate power information with the computerized design models.

19. The non-transitory computer-readable medium of claim 15, wherein the instructions for analyzing and cross-checking are configured to calculate delays for clock domain crossings identified in the computerized design models.

20. The non-transitory computer-readable medium of claim 15, wherein the instructions for analyzing and cross-checking are configured to validate voltage level shifts for power domain crossings identified in the computerized design models.

* * * * *